(12) United States Patent
Hurley, IV et al.

(10) Patent No.: US 11,651,173 B2
(45) Date of Patent: May 16, 2023

(54) MULTIPLE FOCUS ACTUATOR CALIBRATION

(71) Applicant: ZEBRA TECHNOLOGIES CORPORATION, Lincolnshire, IL (US)

(72) Inventors: William P. Hurley, IV, New York, NY (US); Vladimir Gurevich, Great Neck, NY (US); Carl D. Wittenberg, Water Mill, NY (US); Bryan E. Joles, Selden, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 10 days.

(21) Appl. No.: 17/498,532

(22) Filed: Oct. 11, 2021

(65) Prior Publication Data
US 2023/0115527 A1    Apr. 13, 2023

(51) Int. Cl.
*G06K 7/14*    (2006.01)
(52) U.S. Cl.
CPC .................. *G06K 7/1413* (2013.01)
(58) Field of Classification Search
CPC ...... G06K 7/1413; G06K 7/1417; G06K 7/14; G06K 7/10811; G06K 7/10831
USPC ....................... 235/462.01, 454, 462.23, 375
See application file for complete search history.

(56) References Cited

U.S. PATENT DOCUMENTS

2015/0308818 A1* 10/2015 Bridges .................. G01S 7/497
356/3.02
2021/0034032 A1* 2/2021 Hebenstreit ........ B23Q 17/2428

* cited by examiner

*Primary Examiner* — Edwyn Labaze
(74) *Attorney, Agent, or Firm* — Yuri Astvatsaturov

(57) ABSTRACT

Multiple focus ball bearing actuator calibration is disclosed herein. An example method includes focusing, using a ball bearing actuator, a lens to a first focus position to image a first target; recording, in a lookup table, a first distance and a first actuator code corresponding with the first focus position; focusing the lens to a second focus position to image a second target; recording, in the lookup table, a second distance and a second actuator code corresponding with the second focus position; calculating a plurality of focus positions for a plurality of distances over a total working range of the barcode reader using the first focus position and the second focus position, wherein the calculating is performed without a temperature correction factor; and recording, in the lookup table, the plurality of distances and a plurality of actuator codes corresponding to the plurality of focus positions.

30 Claims, 3 Drawing Sheets

MULTIPLE FOCUS ACTUATOR CALIBRATION

BACKGROUND

The use of an optical focusing element allows for an imaging engine to focus to any of a range of potential imaging ranges. However, accurate focusing to a sufficient resolution of the optical focusing element proves difficult. A faster, computationally simpler method of accurately controlling focusing for an optical focusing element of an imaging engine is desired.

SUMMARY

In an embodiment, the present invention is a temperature independent method for calibrating a barcode reader having a field of view (FOV). The method includes: focusing, using a ball bearing actuator including a position sensor, a lens to a first focus position to image a first target of a plurality of targets in the FOV; recording, in a lookup table stored in a memory of the barcode reader, a first distance of the first target and a first actuator code corresponding with the first focus position; focusing, using the ball bearing actuator, the lens to a second focus position to image a second target of the plurality of targets in the FOV; recording, in the lookup table, a second distance of the second target and a second actuator code corresponding with the second focus position; calculating, by a processor, a plurality of focus positions for a plurality of distances over a total working range of the barcode reader using at least the first focus position and the second focus position, wherein the calculating is performed without a temperature correction factor; and recording, in the lookup table, the plurality of distances and a plurality of actuator codes corresponding to the plurality of focus positions; wherein the first actuator code corresponds with the first focus position, the second actuator code corresponds with the second focus position, and the plurality of actuator codes correspond with the plurality of focus positions, agnostic of temperature.

In a variation of this embodiment, the method includes: retrieving, from a memory, a third distance and a third actuator code corresponding with a third focus position; and recording, in the lookup table, the third distance and the third actuator code; wherein the calculating further uses at least the third focus position.

In another variation of this embodiment, the memory from which the third distance and the third actuator code are retrieved is a flash memory of the ball bearing actuator separate from the memory of the barcode reader.

In yet another variation of this embodiment, the first distance is a near distance corresponding with a minimum value of the total working range and the second distance is a far distance corresponding with a maximum value of the total working range.

In still yet another variation of this embodiment, the maximum value of the total working range is infinity.

In another variation of this embodiment, the first distance is a near distance corresponding with a minimum value of the total working range, the second distance is a far distance corresponding with a maximum value of the total working range, and the third distance is a predetermined distance between the near distance and the far distance.

In yet another variation of this embodiment, each of the first focus position, the second focus position, and the plurality of focus positions has a value between 0 micrometers and 500 micrometers.

In still yet another variation of this embodiment, the calculating is performed using a linear function.

In another variation of this embodiment, the first distance, the second distance, and the plurality of distances collectively comprise at most sixteen different distance values over the total working range.

In yet another variation of this embodiment, focusing the lens to the first focus position and focusing the lens to the second focus position are based on a maximum image resolution of the barcode reader.

In another embodiment, the present invention is an imaging system for temperature-agnostic calibration of a barcode reader having a field of view (FOV). The system includes: a lens having a front half and a back half, the lens disposed along an optical axis such that the front half receives light from a plurality of targets within the FOV; an imaging sensor disposed along an optical axis such that the imaging sensor receives light from the back half of the lens; a ball bearing actuator controlling a focus position of the lens by moving the front half of the lens relative to the back half; a memory of the barcode reader, configured to store at least a lookup table; and a microprocessor and computer-readable media storing machine readable instructions that, when executed, cause the barcode reader to: focus the front half of the lens to a first focus position to image a first target of the plurality of targets; record, in the lookup table, a first distance of the first target and a first actuator code corresponding with the first focus position; focus the front half of the lens to a second focus position to image a second target of the plurality of targets; record, in the lookup table, a second distance of the second target and a second actuator code corresponding with the second focus position; calculate a plurality of focus positions for a plurality of distances over a total working range of the barcode reader using at least the first focus position and the second focus position, wherein the calculating is performed without a temperature correction factor; and record, in the lookup table, the plurality of distances and a plurality of actuator codes corresponding to the plurality of focus positions; wherein the first actuator code corresponds with the first focus position, the second actuator code corresponds with the second focus position, and the plurality of actuator codes correspond with the plurality of focus positions, agnostic of temperature.

In a variation of this embodiment, the microprocessor and computer-readable media stores further machine readable instructions that, when executed, cause the barcode reader to: retrieve, from a memory, a third distance and a third actuator code corresponding with a third focus position; record, in the lookup table, the third distance and the third actuator code; and further wherein the calculating further uses at least the third focus position.

In another variation of this embodiment, the system further includes a flash memory of the ball bearing actuator separate from the memory of the barcode reader, wherein the memory from which the third distance and the third actuator code are retrieved is the flash memory of the ball bearing actuator.

In yet another variation of this embodiment, the first distance is a near distance corresponding with a minimum value of the total working range and the second distance is a far distance corresponding with a maximum value of the total working range.

In still yet another variation of this embodiment, the maximum value of the total working range is infinity.

In another variation of this embodiment, the first distance is a near distance corresponding with a minimum value of the total working range, the second distance is a far distance corresponding with a maximum value of the total working range, and the third distance is a predetermined distance between the near distance and the far distance.

In yet another variation of this embodiment, each of the first focus position, the second focus position, and the plurality of focus positions has a value between 0 micrometers and 500 micrometers.

In still yet another variation of this embodiment, the calculating is performed using a linear function.

In another variation of this embodiment, the first distance, the second distance, and the plurality of distances collectively comprise at most sixteen different distance values over the total working range.

In yet another variation of this embodiment, focusing the lens to the first focus position and focusing the lens to the second focus position are based on a maximum image resolution of the barcode reader.

In yet another embodiment, the present invention is a system to perform temperature-agnostic calibration of a barcode reader having a field of view (FOV) and subsequently cause the barcode reader to operate in accordance with the temperature-agnostic calibration. The system includes: a lens having a front half and a back half, the lens disposed along an optical axis such that the front half receives light from a plurality of targets within the FOV; an imaging sensor disposed along an optical axis such that the imaging sensor receives light from the back half of the lens; a ball bearing actuator including a position sensor and controlling a focus position of the lens by moving the front half of the lens relative to the back half; a memory of the barcode reader, configured to store at least a lookup table; and a microprocessor and computer-readable media storing machine readable instructions that, when executed, cause the barcode reader to: focus the front half of the lens to a first focus position to image a first target of the plurality of targets; record, in the lookup table, a first distance of the first target and a first actuator code corresponding with the first focus position; focus the front half of the lens to a second focus position to image a second target of the plurality of targets; record, in the lookup table, a second distance of the second target and a second actuator code corresponding with the second focus position; calculate a plurality of focus positions for a plurality of distances over a total working range of the barcode reader using at least the first focus position and the second focus position, wherein the calculating is performed without a temperature correction factor; record, in the lookup table, the plurality of distances and a plurality of actuator codes corresponding to the plurality of focus positions; and, responsive to receiving a signal and after recording the plurality of distances and the plurality of actuator codes, focus the front half of the lens to an operational focus position to image an operational target based on the lookup table; wherein the first actuator code corresponds with the first focus position, the second actuator code corresponds with the second focus position, and the plurality of actuator codes correspond with the plurality of focus positions, agnostic of temperature.

In a variation of this embodiment, focusing the front half of the lens to the operational focus position comprises: determining a target distance of the operational target, wherein the target distance is a distance from the barcode reader to the operational target; determining, via the lookup table, an operational distance, wherein the operational distance is whichever one of the first distance, the second distance, or any one of the plurality of distances is closest in value to the target distance; and focusing the front half of the lens to the operational focus position that corresponds with the operational distance.

In another variation of this embodiment, focusing the front half of the lens to the operational focus position further comprises: determining to modify the operational focus position; moving the front half of the lens to an actuator code by determining an actuator code corresponding to a modification distance; and determining whether to continue modifying the operational focus position.

In yet another variation of this embodiment, determining to modify the operational focus position is in response to a determination that the barcode reader cannot image the operational target and the system determines not to continue modifying the operational focus position when the barcode reader can image the operational target.

In still yet another variation of this embodiment, the modification distance is less than a value of a distance between the operational focus position and a focus position of the plurality of focus positions with a value closest to the operational focus position.

In another variation of this embodiment, the modification distance is less than half of a value of a distance between the operational focus position and a focus position of the plurality of focus positions with a value closest to the operational focus position.

In yet another variation of this embodiment, the modification distance is determined based on a difference between the operational distance and the target distance.

In still yet another variation of this embodiment, the microprocessor and computer-readable media stores further machine readable instructions that, when executed, cause the barcode reader to: retrieve, from a memory, a third distance and a third actuator code corresponding with a third focus position; record, in the lookup table, the third distance and the third actuator code; and further wherein the calculating further uses at least the third focus position.

In another variation of this embodiment, the system further comprises a flash memory of the ball bearing actuator separate from the memory of the barcode reader, wherein the memory from which the third distance and the third actuator code are retrieved is the flash memory of the ball bearing actuator.

In yet another variation of this embodiment, the first distance, the second distance, and the plurality of distances collectively comprise at most sixteen different distance values over the total working range.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
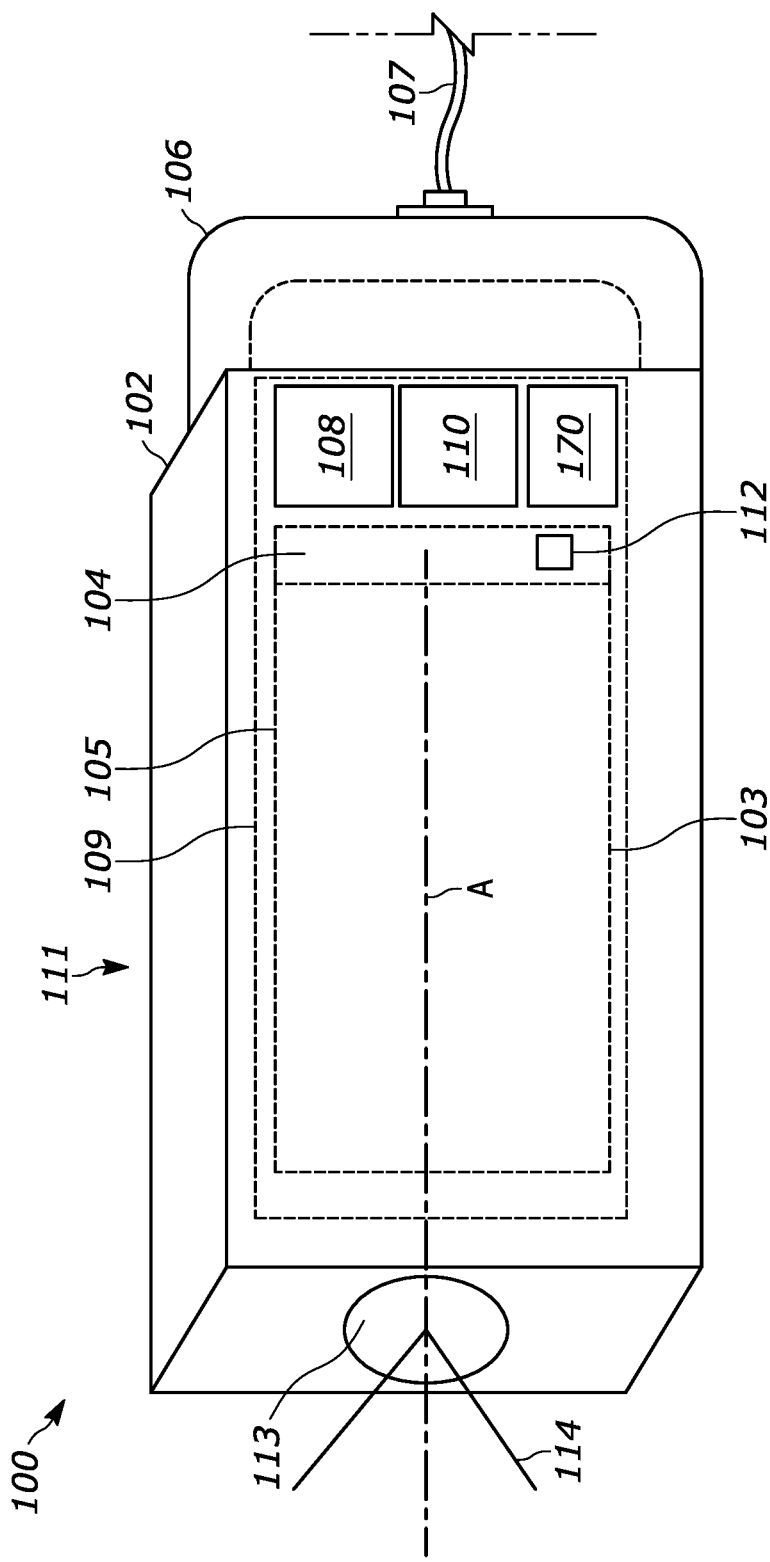
FIG. 1 is a schematic side elevation view of a device having an imaging system, in accordance with aspects of this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A portable, high-performance optical imaging system for machine vision, barcode reading, etc. applications makes use of a variable focusing element to provide a wide range for focusing while reducing overall space required. Such a variable focusing element may require advanced focusing capabilities to achieve desired resolutions for processing images for machine vision, barcode reading, etc. processes. However, autofocusing to a required focus position from a base position may be slow and/or difficult. Further, factors in traditional focusing elements such as temperature, age, and driver voltage may lead to lower accuracy or further increased focusing times. However, a method of calibrating a variable focusing element using a ball bearing actuator with a position and/or feedback sensor provides faster focusing and greater accuracy by quickly dividing a working range of the variable focusing element into calculated focus positions without need for correction of factors such as temperature and storing data related to the focus positions in a lookup table for quick access. Further, such calibration may be performed with only two or three calibration points due to the nature of the relation between the focus positions and target distances as described in detail below.

An example imaging-based device 100 is shown schematically in FIG. 1. The device 100 includes a housing 102 and an imaging system 103 at least partially disposed within the housing 102 that includes an imaging camera assembly. Specifically, the imaging system 103 includes an image sensor 104, and an optical assembly 105. The device 100 may be adapted to be inserted into a docking station 106 which, in some examples, may include a cable or connector 107 to receive power from a power source (e.g., a direct current (DC) or alternating current (AC) power source) to receive power for the device 100. The device 100 may further include an onboard power supply or power storage device 108 such as a battery, and a printed circuit board 109 which may accommodate a memory 170 and a controller 110 that controls operation of the imaging system 103 and, more generally, the device 100. In examples, the device 100 may include a trigger (not shown in the illustration for clarity) that is used to activate the imaging system 103 to capture an image. The device 100 may include any number of additional components such as decoding systems, processors, and/or circuitry coupled to the printed circuit board 109 to assist in operation of the device 100.

The housing 102 includes a forward portion 111 which supports the imaging system 103 at least partially within an interior region of the housing 102 using any number of components, assemblies and/or approaches. The imaging system 103 may be, but does not have to be, modular as it may be removed or inserted as a unit into devices, allowing the ready substitution of imaging systems 103 having different imaging characteristics (e.g., camera assemblies having different focal distances, working ranges, and FOVs) for use in different devices and systems. In some examples, the field of view may be static.

The image sensor 104 may have a plurality of photosensitive elements, one of which is shown at reference numeral 112 formed in a substantially flat arrangement. The image sensor 104 may be fixedly mounted to the printed circuit board 109 using any number of components, structures, and/or approaches. The image sensor 104 further has a defined central imaging axis A that is normal to the substantially flat arrangement. In some examples, the imaging axis A is coaxial with a central axis of the optical assembly 105. The optical assembly 105 may be fixedly and/or removably mounted relative to the housing 102 using any number of components and/or approaches.

The imaging sensor 104 may be a one megapixel sensor with pixels of approximately 3 microns in size. In embodiments, the imaging sensor 104 includes 3 millimeter pixels, having a total of about 2 megapixels, resulting in an overall imaging sensor width and length of 3 microns in each dimension. In embodiments, the optical assembly 105 is configured to capture images with a modulation transfer function of 40% at 160 line pairs per millimeter.

In the illustrated example, the optical assembly 105 is positioned between a front aperture 113 and the image sensor 104. The front aperture 113 blocks light from objects outside of a FOV 114 which reduces imaging problems due to stray light from objects other than a target object. Additionally, the front aperture 113 in conjunction with a plurality of lenses, and lens groups (such as the lenses and lens groups described in FIG. 2 below) allows for an image to form as intended on the image sensor 104. In some examples, the housing 102 includes additional elements such as an illumination system (not shown in the illustration for clarity) configured to illuminate a target object for imaging. The illumination system may include a light emitting diode, laser diode, black body radiation source, or another illumination source.

Figure 2:
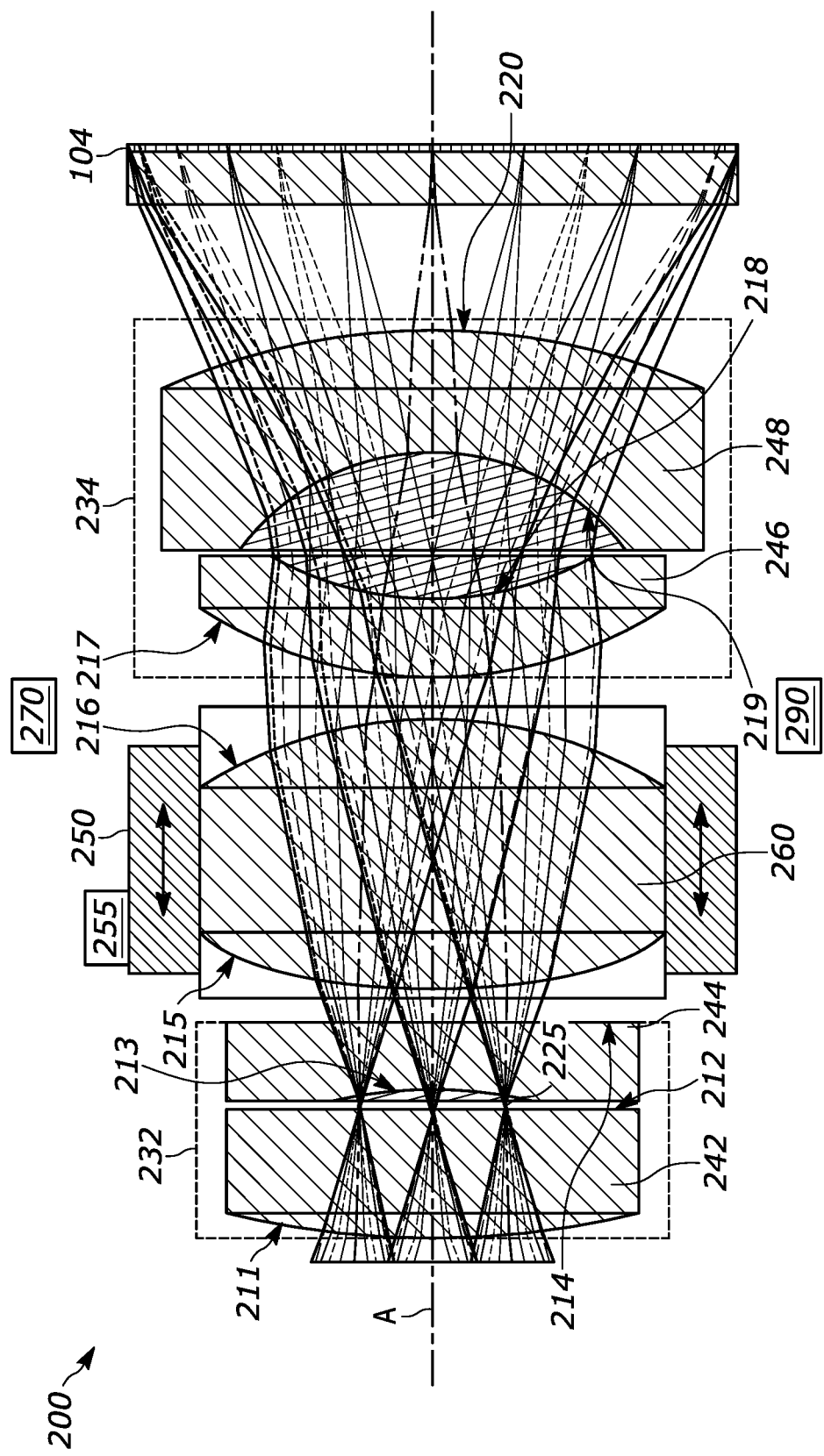
FIG. 2 is a cross-sectional side view of an example optical assembly having a voice coil motor to focus the optical assembly, in accordance with aspects of this disclosure, which may be used to implement the optical assembly of FIG. 1.

FIG. 2 illustrates an example optical assembly in the form of an optical assembly 200 that may be used to implement the example optical assembly 105 of FIG. 1. The example optical assembly 200 may include, among possibly other optical elements, (i) a front lens group 232 including an aperture stop 225, (ii) an adjustable and/or movable imaging lens 260, (iii) any type of ball bearing actuator 250 with position feedback configured to move the movable imaging lens 260 over, for example, a range of 500 microns to focus the optical assembly 200, and (iv) a back lens group 234. Depending on the implementation, some optical elements may include others—for example, certain fixed imaging lenses such as those in front lens group 232 may be included as part of the movable imaging lens 260. Similarly, though the ball bearing actuator 250 and the movable imaging lens 260 are described in reference to the optical assembly 200, one skilled in the art will recognize that techniques used and applied by the ball bearing actuator 250 with regard to the movable imaging lens 260 may be performed by ball bearing actuators and movable imaging lenses in other optical assemblies comprised of fewer, more, and/or different elements.

A housing 102 may be used to hold elements of the optical assembly 200 in a fixed place on or coupled to a printed circuit board (such as circuit board 109). The housing 102 holds the front lens group 232, the movable imaging lens 260 and the back lens group 234 in a fixed relationship along an optical axis A. In some examples, elements of the lens groups 232 and 234 have fixed positions and/or are arranged to prevent damage to the movable imaging lens 260 as the movable imaging lens 260 is moved back and forth (e.g., along the optical axis A) between the lens groups 232 and 234 by the ball bearing actuator 250 within the optical assembly 200. In some examples, the front lens group 232, the movable imaging lens 260, and the back lens group 234 are configured and arranged in a telephoto arrangement to increase variable optical power range and/or reduce the length of the optical assembly 200.

The entire optical assembly 200 is thermally stable, i.e., the focusing does not vary with temperature, therefore neither the ball bearing actuator 250 nor the controller 110 need to compensate for the thermal focus shift and the ball bearing actuator 250 does not lose its travel range due to temperature. Further, the use of the ball bearing actuator 250 in optical assembly 200 is stable with regard to and/or reduces effects of lens aging and driver voltage variations on focusing compared to other focusing optical elements such as a liquid lens.

In some implementations, the ball bearing actuator 250 is, may be referred to, or functions similarly to a voice coil motor (VCM) actuator. Depending on the implementation, the ball bearing actuator 250 may include or be communicatively coupled to a position sensor 255. In some implementations, the position sensor 255 is built into the ball bearing actuator 250. In other implementations, the position sensor 255 is a separate component communicatively and/or physically connected to the ball bearing actuator 250.

The first lens group 232 is disposed along the optical axis A and is configured to receive light from an object of interest (e.g., a barcode) in a FOV and correct for aberrations of a first image projected by the front lens group 232. The front lens group 232 includes one or more lens elements 242 and 244. In some implementations, the lens elements 242 and 244 and the movable imaging lens 260 are arranged to form a Cooke triplet. In some embodiments, the lens element 242 is a positive optical element, and the lens element 244 is a negative optical element. Depending on the implementation, lens element 242 may further be a crown glass lens and lens element 244 may be a flint glass lens. In other implementations, both of lens elements 242 and 244 may instead be plastic lenses. An aperture stop 225 is formed between the lens elements 242 and 244. The front lens group 232 may further include an additional optical element (e.g., a lens element) disposed to increase a FOV of the optical assembly 200.

The movable imaging lens 260 is positioned or located between the lens groups 232 and 234 of the optical assembly 200. In the example of FIG. 2, only the movable imaging lens 260 needs to be moved/adjusted/positioned to adjust focus of the optical assembly 200. Because of the focusing gain obtained by the optical assembly of FIG. 2, only a small (e.g., 500 microns) range of motion for the movable imaging lens 260 is needed in the optical assembly of FIG. 2. Accordingly, a small ball bearing actuator may be used. The ball bearing actuator 250 further includes a feedback and/or position sensor that allows the controller 110 to determine how much the ball bearing actuator 250 has moved the movable imaging lens 260. The movable imaging lens 260 may be an aspheric crown plastic optical element having an optical power greater than the total power of the optical assembly 200 and/or greater than a combined optical power of the front lens group 232 and the back lens group 234. Example plastic materials that may be used to form the movable imaging lens 260 include, but are not limited to, EP6000, OKP1, SP-1516, etc.

The back lens group 234 having lens elements 246 and 248 is disposed along the optical axis A to receive light from the movable imaging lens 260, correct for field curvature, and form a second image on a solid-state image sensor, such as the image sensor 104. The lens elements 246 and 248 may be plastic and/or aspheric lens elements 246 and 248 arranged to form a negative optical power. In some examples, the lens elements 246 and 248 of the back lens group 234 are disposed to provide a predetermined chief ray angle and/or to match a chief ray angle of the image sensor 104.

Lens groups 232 and 234 may have lower optical power and, as such, be less sensitive to mechanical tolerances than movable imaging lens 260. Therefore, lens groups 232 and 234 may be less complex and/or less expensive to manufacture. Lens groups 232 and 234 can be used to compensate for and control aberrations for the movable imaging lens 260. In some implementations, an overall optical power of the front lens group 232 combined with the back lens group 234 is configured to be less than the optical power of the movable imaging lens 260 to reduce sensitivity to mechanical tolerances and/or manage the imaging lens aberrations.

The optical assembly 200 is configured to, via any number and/or type(s) of interfaces, such as an interface 290, convey position data for the movable imaging lens 260, and receive control data for the ball bearing actuator 250 from a processor (e.g., of the device 100, a machine vision system, a barcode reader, etc.). The ball bearing actuator 250 includes a position sensor 255 that provides position and/or feedback data to the interface 290 and the ball bearing actuator 250.

In some implementations, the optical assembly 200 includes or is communicatively coupled with a flash memory 270 separate from the memory 170. Depending on the implementation, the flash memory 270 stores data related to the operation and/or calibration of the ball bearing actuator 250. For example, the flash memory 270 may store a default and/or predetermined target distance and corresponding focus position and actuator code to act as a calibration or default targeting point.

The image sensor 104 may be any type of image sensor configured to generate an electrical signal representative of images formed on the image sensor 104, and to provide the electrical signal to a processor (e.g., the controller 110) via the interface 290 and/or another means. When an object of interest is a barcode, the processor and/or a barcode decoder may decode the barcode to form the electrical signal.

In some examples, the lens element 242 has a spherical surface 211, a substantially flat surface 212 and a positive optical power; the lens element 244 has aspherical surfaces 213 and 214 and a negative optical power; the movable imaging lens 260 has two spherical surfaces 215 and 216 and a positive optical power; the lens element 246 has aspherical surfaces 217 and 218 and a negative optical power; and the lens element 248 has aspherical surfaces 219 and 220 and a negative optical power. In some implementations, the first surface 215 of the movable imaging lens 260 may be a front half of the movable imaging lens 260 and may be able to move relative to the second surface 216, which may be a back half of the movable imaging lens 260. In some examples of such implementations, the movable imaging lens 260 is a lens group and the first surface 215 and second surface 216 are a first surface of a first lens of the lens group and a second surface of a second lens of the lens group. In such example implementations, the ball bearing actuator 250 moves the first lens of the movable lens 260 relative to the second lens. In further implementations, the entirety of movable imaging lens 260 is moved by the ball bearing actuator 250, and both surfaces 215 and 216 move while staying approximately the same distance apart.

Figure 3:
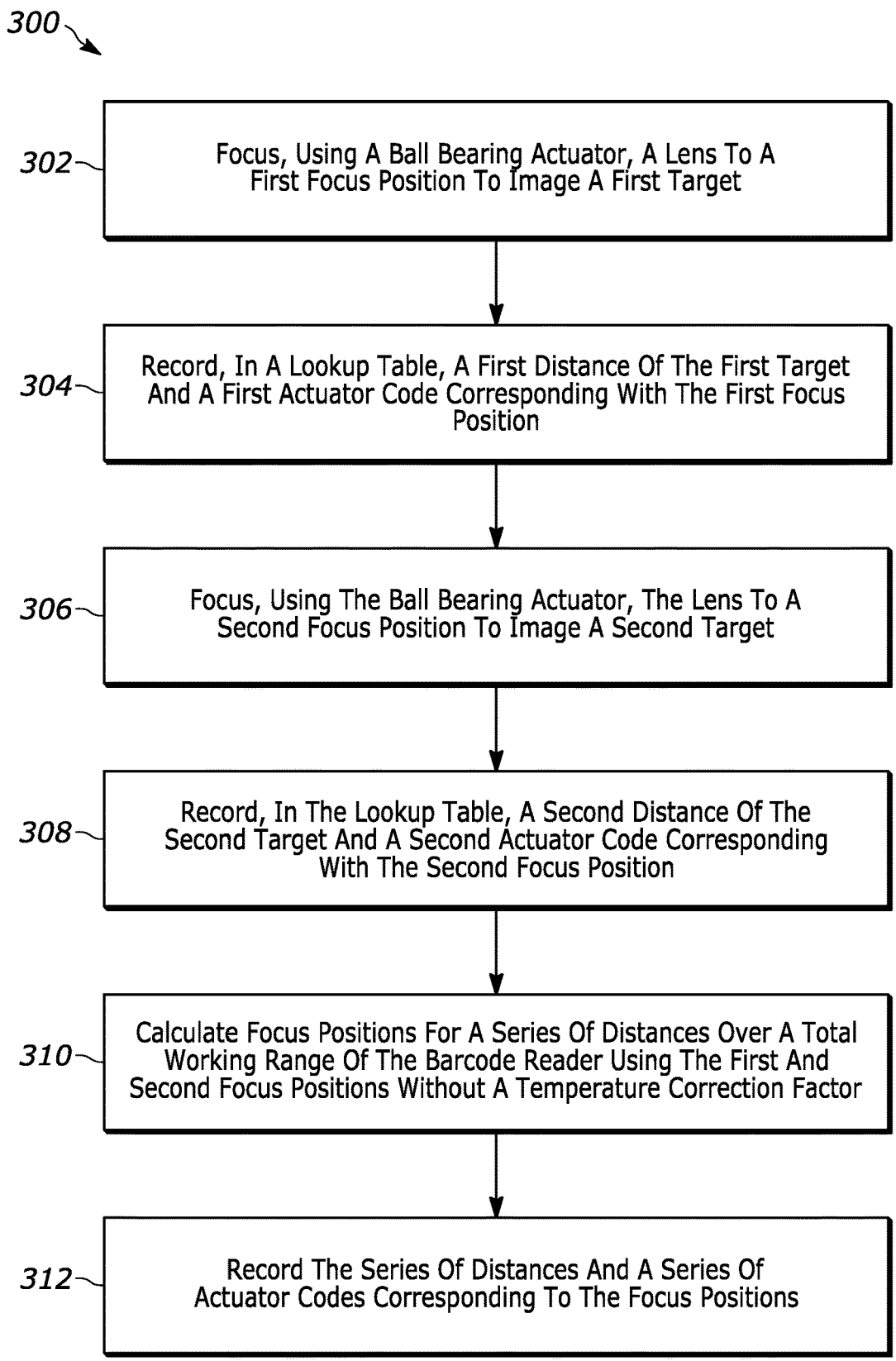
FIG. 3 is an example flow diagram of a method for configuring and controlling a ball bearing actuator of the imaging assembly in FIGS. 1-2 in accordance with various embodiments.

Referring next to FIG. 3, a flowchart 300 illustrates a method for calibrating a barcode reader having a field of view (FOV). For the sake of clarity, FIG. 3 is discussed with regard to the controller 110, optical assembly 200, actuator 250, and movable imaging lens 260. However, any similarly suitable controller, optical assembly, actuator, and/or movable imaging lens may be used to implement the techniques of flowchart 300.

At block 302, the controller 110 causes a ball bearing actuator 250 to move and focus a movable imaging lens 260 of the optical assembly 200 to a first focus position to image a first target. In some implementations, the ball bearing actuator 250 focuses the movable imaging lens 260 to a point where the controller 110 is capable of reading the target using optical character recognition (OCR). In further implementations, the ball bearing actuator 250 focuses the movable imaging lens 260 to a point where the controller 110 is capable of decoding the target or a code on the target (e.g., a barcode, QR code, etc.). As is noted in FIG. 2 above, in some implementations, the ball bearing actuator 250 moves a first half and/or surface 215 of the movable imaging lens 260 while the back half and/or surface 216 of the movable imaging lens 260 remains in place.

At block 304, the controller 110 measures and records the distance of the first target in a lookup table stored in the memory 170. In a corresponding location of the lookup table, the controller 110 records a first actuator code that corresponds with the first focus position. In some implementations, the controller 110 is programmed with 4096 unique actuator codes, corresponding with an equal number of focus positions. In some such implementations, the actuator codes are numbered from 0 to 4095 and cover a range of movement for the ball bearing actuator 250 from a displacement of 0 micrometers at position code 0 (e.g., a default or minimum position) to 500 micrometers at position code 4095 (e.g., a fully extended position or maximum).

At block 306, the controller 110 then causes the ball bearing actuator 250 to move and/or focus the movable imaging lens 260 of the optical assembly 200 to a second focus position to image a second target. In some implementations, the second target is the first target in a second location. In other implementations, one or both of the first target and the second target are virtual targets. Similarly to block 302, depending on the implementation, the controller 110 may focus the lens to a point in which the controller is capable of reading or decoding the target using techniques such as OCR, barcode decoding, or other similar techniques. Also similar to block 302 above, in some implementations, the ball bearing actuator 250 moves a first half and/or surface 215 of the movable imaging lens 260 while the back half and/or surface 216 of the movable imaging lens 260 remains in place.

At block 308, the controller 110 measures and records the distance of the second target in the lookup table stored in the memory 170. Similarly to block 304, depending on the implementation, the controller 110 may also store an actuator code of the 4096 unique focus positions for the ball bearing actuator 250 corresponding with a focus position ranging from 0 to 500 micrometers of displacement in a corresponding portion of the lookup table.

In some implementations, one of the distances (e.g., the first distance) corresponds with a minimum distance value and another distance (e.g., the second distance) corresponds with a maximum distance value, denoting the overall range of distances for imaging. Depending on the implementation, the second target may be a virtual target placed at a far distance range, designated as a value of infinity or optical infinity.

In further implementations, the controller 110 further records a third distance and a third focus position. In some implementations, the controller 110 repeats the process detailed in blocks 302/304 or 306/308 for a third target. Alternatively, the values corresponding to the third target distance and actuator code may be stored on a flash memory 270 of the ball bearing actuator 250, and the controller 110 may retrieve and/or receive the third target distance value and/or the third actuator code from the memory 270 of the ball bearing actuator 250. In some implementations, the third target distance is a distance between the first distance and the second distance—i.e., a middle distance value. Depending on the implementation, the third target distance represents a common distance, a preferred operation setting for the ball bearing actuator 250, an estimated midpoint in an expected use range, or some other predetermined value.

At block 310, the controller 110 calculates focus positions for a series of distances over a total working range of the barcode reader. In some implementations, the working range of the barcode reader is determined based on a pre-determined minimum distance and maximum distance. In further implementations, the pre-determined minimum and maximum distances are based on the focus positions corresponding to actuator codes 0 and 4095. In other implementations, the working range is defined by the first target distance and the second target distance, with the first target distance being the minimum and the second target distance being the maximum. In still other implementations, the working range is 0 to an arbitrarily far distance (i.e., optical infinity).

The controller 110 calculates the focus positions for the series of distances using at least the first and second focus positions. In some implementations, the relation between a plot of the first and second focus positions (and, as such, the first and second actuator codes) and the first and second target distances is linear or substantially linear in nature over the working range. As such, in such implementations, the focus positions fall along the linear plot defined by the first and second focus position and target distance points.

In some implementations, the controller 110 divides the focus positions into at most 16 focus positions spread over the working range. Depending on the implementation, the controller 110 may attempt to minimize the number of focus positions to improve focusing speed or may divide the focus positions into 16 focus positions. The 16 focus positions include the first and second focus positions, and may include the third focus position in implementations in which the controller determines, retrieves, or receives the third focus position as described above. In some implementations, the 16 focus positions are spread equidistant along the working range. In other implementations, the 16 focus positions represent common target distances and/or clusters of common target distances. In still other implementations, the 16 focus positions may be determined via a combination of equidistance and commonality, or may be determined using a similarly suitable method.

Unlike current techniques and systems, the above systems and methods are agnostic to temperature and driver voltage variations. As such, the relation between actuator codes and focus position is similarly agnostic to temperature and driver voltage variations. Put another way, when focusing the lens, the controller 110 does not need to apply correction factors (i.e., a temperature correction factor, a driver voltage correction factor, etc.) in determining what position the ball bearing actuator 250 should focus the lens to. Similarly, the controller 110 therefore calculates the focus positions without applying correction factors or otherwise taking factors such as temperature or driver voltage into account. As such, the device 100 calibrates lens focus positions more accurately and more quickly than existing devices.

At block 312, the controller 110 then records the series of distances and series of actuator codes corresponding to the focus positions in the lookup table. The controller 110 then determines that calibration is complete and, in some implementations, notifies the user that the device 100 is calibrated. Depending on the implementation, the device 100 emits an audio and/or visual cue or causes a communicatively coupled system to indicate that calibration is finished.

Once the controller 110 has finished calibrating the device 100, the controller 110 may subsequently use the ball bearing actuator 250 to focus the movable imaging lens 260 in response to receiving a signal denoting that a user is beginning operation of the device 100. The controller 110 causes the ball bearing actuator 250 to focus the front half of the lens to an operational focus position to image an operational target based on the populated lookup table. In some implementations, the controller 110 causes the device 100 to operate by determining a target distance for an operational target and, using the target distance, determining the closest focus position of the series of focus positions by accessing the lookup table. In particular, the controller 110 may determine an operational distance for the operational target by comparing the target distance to the recorded distances in the lookup table and determining which one of the recorded distances (i.e., the first distance, second distance, and each of the plurality of distances) is closest in value to the target distance. The controller 110 then causes the ball bearing actuator 250 to focus the front half of the movable imaging lens 260 to the operational focus position that corresponds with the operational distance according to the lookup table using the corresponding actuator codes.

In some embodiments, the controller 110 may determine that the closest focus position is a sufficient operational focus position for imaging the operational target and ends focusing. In other embodiments, the controller 110 may determine that the operational focus position should be modified. The controller 110 may then cause the device 100 to adjust the focus position to actuator codes near the code recorded in the lookup table to fine-tune the focus on the target and subsequently decode the target. For example, the controller 110 may determine that the target distance is 32 inches. The controller 110 then accesses the lookup table to determine the closest stored target distance (e.g., 30 inches) and determine the corresponding actuator code (e.g., code 1023, corresponding with a focus position of 125 micrometers).

In some implementations, the controller 110 may move to an actuator code corresponding with a distance between two recorded focus positions. Put another way, the controller 110 may determine to only move the operational focus position by some modification distance less than the value between the operational focus position value and the closest focus position value. In further implementations, the controller 110 determines to only move the operational focus position by half of the amount between the operational focus position value and the closest focus position value, as if the best focus position would otherwise be closer to the closest focus position value and the controller 110 would not have decided to use the current operational focus position. In still further implementations, the modification distance is determined based on a difference between the operational distance and the target distance. The controller 110, may then either begin operation using the corresponding actuator code or may begin making small adjustments in a range near the actuator code (e.g., within 100 codes or 25 micrometers) to find an operating focus position.

The above description refers to the accompanying drawings. Alternative implementations of the example represented by the drawings includes one or more additional or alternative elements, processes and/or devices. Additionally or alternatively, one or more of the example blocks of the drawings may be combined, divided, re-arranged or omitted. Components represented by the blocks of the drawings are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A temperature independent method for calibrating a barcode reader having a field of view (FOV), the method comprising:

focusing, using a ball bearing actuator including a position sensor, a lens to a first focus position to image a first target of a plurality of targets in the FOV;

recording, in a lookup table stored in a memory of the barcode reader, a first distance of the first target and a first actuator code corresponding with the first focus position;

focusing, using the ball bearing actuator, the lens to a second focus position to image a second target of the plurality of targets in the FOV;

recording, in the lookup table, a second distance of the second target and a second actuator code corresponding with the second focus position;

calculating, by a processor, a plurality of focus positions for a plurality of distances over a total working range of the barcode reader using at least the first focus position and the second focus position, wherein the calculating is performed without a temperature correction factor; and recording, in the lookup table, the plurality of distances and a plurality of actuator codes corresponding to the plurality of focus positions;

wherein the first actuator code corresponds with the first focus position, the second actuator code corresponds with the second focus position, and the plurality of actuator codes correspond with the plurality of focus positions, agnostic of temperature.

2. The method of claim 1, further comprising:

retrieving, from a memory, a third distance and a third actuator code corresponding with a third focus position; and recording, in the lookup table, the third distance and the third actuator code;

wherein the calculating further uses at least the third focus position.

3. The method of claim 2, wherein the memory from which the third distance and the third actuator code are retrieved is a flash memory of the ball bearing actuator separate from the memory of the barcode reader.

4. The method of claim 2, wherein the first distance is a near distance corresponding with a minimum value of the total working range, the second distance is a far distance corresponding with a maximum value of the total working range, and the third distance is a predetermined distance between the near distance and the far distance.

5. The method of claim 1, wherein the first distance is a near distance corresponding with a minimum value of the total working range and the second distance is a far distance corresponding with a maximum value of the total working range.

6. The method of claim 5, wherein the maximum value of the total working range is infinity.

7. The method of claim 1, wherein each of the first focus position, the second focus position, and the plurality of focus positions has a value between 0 micrometers and 500 micrometers.

8. The method of claim 1, wherein the calculating is performed using a linear function.

9. The method of claim 1, wherein the first distance, the second distance, and the plurality of distances collectively comprise at most sixteen different distance values over the total working range.

10. The method of claim 1, wherein focusing the lens to the first focus position and focusing the lens to the second focus position are based on a maximum image resolution of the barcode reader.

11. An imaging system for temperature-agnostic calibration of a barcode reader having a field of view (FOV), the system comprising:
  a lens having a front half and a back half, the lens disposed along an optical axis such that the front half receives light from a plurality of targets within the FOV;
  an imaging sensor disposed along an optical axis such that the imaging sensor receives light from the back half of the lens;
  a ball bearing actuator including a position sensor and controlling a focus position of the lens by moving the front half of the lens relative to the back half;
  a memory of the barcode reader, configured to store at least a lookup table; and
  a microprocessor and computer-readable media storing machine readable instructions that, when executed, cause the barcode reader to:
    focus the front half of the lens to a first focus position to image a first target of the plurality of targets;
    record, in the lookup table, a first distance of the first target and a first actuator code corresponding with the first focus position;
    focus the front half of the lens to a second focus position to image a second target of the plurality of targets;
    record, in the lookup table, a second distance of the second target and a second actuator code corresponding with the second focus position;
    calculate a plurality of focus positions for a plurality of distances over a total working range of the barcode reader using at least the first focus position and the second focus position, wherein the calculating is performed without a temperature correction factor; and
    record, in the lookup table, the plurality of distances and a plurality of actuator codes corresponding to the plurality of focus positions;
  wherein the first actuator code corresponds with the first focus position, the second actuator code corresponds with the second focus position, and the plurality of actuator codes correspond with the plurality of focus positions, agnostic of temperature.

12. The system of claim 11, wherein the microprocessor and computer-readable media stores further machine readable instructions that, when executed, cause the barcode reader to:
  retrieve, from a memory, a third distance and a third actuator code corresponding with a third focus position;
  record, in the lookup table, the third distance and the third actuator code; and
  further wherein the calculating further uses at least the third focus position.

13. The system of claim 12, further comprising a flash memory of the ball bearing actuator separate from the memory of the barcode reader, wherein the memory from which the third distance and the third actuator code are retrieved is the flash memory of the ball bearing actuator.

14. The system of claim 11, wherein the first distance is a near distance corresponding with a minimum value of the total working range and the second distance is a far distance corresponding with a maximum value of the total working range.

15. The system of claim 14, wherein the maximum value of the total working range is infinity.

16. The system of claim 11, wherein the first distance is a near distance corresponding with a minimum value of the total working range, the second distance is a far distance corresponding with a maximum value of the total working range, and the third distance is a predetermined distance between the near distance and the far distance.

17. The system of claim 11, wherein each of the first focus position, the second focus position, and the plurality of focus positions has a value between 0 micrometers and 500 micrometers.

18. The system of claim 11, wherein the calculating is performed using a linear function.

19. The system of claim 11, wherein the first distance, the second distance, and the plurality of distances collectively comprise at most sixteen different distance values over the total working range.

20. The system of claim 11, wherein focusing the lens to the first focus position and focusing the lens to the second focus position are based on a maximum image resolution of the barcode reader.

21. A system to perform temperature-agnostic calibration of a barcode reader having a field of view (FOV) and subsequently cause the barcode reader to operate in accordance with the temperature-agnostic calibration, the system comprising:
  a lens having a front half and a back half, the lens disposed along an optical axis such that the front half receives light from a plurality of targets within the FOV;
  an imaging sensor disposed along an optical axis such that the imaging sensor receives light from the back half of the lens;
  a ball bearing actuator including a position sensor and controlling a focus position of the lens by moving the front half of the lens relative to the back half;
  a memory of the barcode reader, configured to store at least a lookup table; and
  a microprocessor and computer-readable media storing machine readable instructions that, when executed, cause the barcode reader to:
    focus the front half of the lens to a first focus position to image a first target of the plurality of targets;

record, in the lookup table, a first distance of the first target and a first actuator code corresponding with the first focus position;

focus the front half of the lens to a second focus position to image a second target of the plurality of targets;

record, in the lookup table, a second distance of the second target and a second actuator code corresponding with the second focus position;

calculate a plurality of focus positions for a plurality of distances over a total working range of the barcode reader using at least the first focus position and the second focus position, wherein the calculating is performed without a temperature correction factor;

record, in the lookup table, the plurality of distances and a plurality of actuator codes corresponding to the plurality of focus positions; and responsive to receiving a signal and after recording the plurality of distances and the plurality of actuator codes, focus the front half of the lens to an operational focus position to image an operational target based on the lookup table;

wherein the first actuator code corresponds with the first focus position, the second actuator code corresponds with the second focus position, and the plurality of actuator codes correspond with the plurality of focus positions, agnostic of temperature.

22. The system of claim 21, wherein focusing the front half of the lens to the operational focus position comprises:

determining a target distance of the operational target, wherein the target distance is a distance from the barcode reader to the operational target;

determining, via the lookup table, an operational distance, wherein the operational distance is whichever one of the first distance, the second distance, or any one of the plurality of distances is closest in value to the target distance; and focusing the front half of the lens to the operational focus position that corresponds with the operational distance.

23. The system of claim 22, wherein focusing the front half of the lens to the operational focus position further comprises:

determining to modify the operational focus position;

moving the front half of the lens to an actuator code by determining an actuator code corresponding to a modification distance; and determining whether to continue modifying the operational focus position.

24. The system of claim 23, wherein the determining to modify the operational focus position is in response to a determination that the barcode reader cannot image the operational target and the system determines not to continue modifying the operational focus position when the barcode reader can image the operational target.

25. The system of claim 23, wherein the modification distance is less than a value of a distance between the operational focus position and a focus position of the plurality of focus positions with a value closest to the operational focus position.

26. The system of claim 23, wherein the modification distance is less than half of a value of a distance between the operational focus position and a focus position of the plurality of focus positions with a value closest to the operational focus position.

27. The system of claim 23, wherein the modification distance is determined based on a difference between the operational distance and the target distance.

28. The system of claim 21, wherein the microprocessor and computer-readable media stores further machine readable instructions that, when executed, cause the barcode reader to:

retrieve, from a memory, a third distance and a third actuator code corresponding with a third focus position;

record, in the lookup table, the third distance and the third actuator code; and further wherein the calculating further uses at least the third focus position.

29. The system of claim 28, further comprising a flash memory of the ball bearing actuator separate from the memory of the barcode reader, wherein the memory from which the third distance and the third actuator code are retrieved is the flash memory of the ball bearing actuator.

30. The system of claim 21, wherein the first distance, the second distance, and the plurality of distances collectively comprise at most sixteen different distance values over the total working range.

* * * * *